(12) United States Patent
Jo et al.

(10) Patent No.: US 10,924,205 B2
(45) Date of Patent: Feb. 16, 2021

(54) METHOD FOR TRANSMITTING OR RECEIVING SIGNAL IN WIRELESS COMMUNICATION SYSTEM AND APPARATUS THEREFOR

(71) Applicant: LG Electronics Inc., Seoul (KR)

(72) Inventors: Soonki Jo, Seoul (KR); Yunjung Yi, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 60 days.

(21) Appl. No.: 16/318,121

(22) PCT Filed: Jun. 1, 2018

(86) PCT No.: PCT/KR2018/006288
§ 371 (c)(1),
(2) Date: Jan. 15, 2019

(87) PCT Pub. No.: WO2018/222001
PCT Pub. Date: Dec. 6, 2018

(65) Prior Publication Data
US 2019/0245648 A1    Aug. 8, 2019

Related U.S. Application Data

(60) Provisional application No. 62/544,075, filed on Aug. 11, 2017, provisional application No. 62/514,019, (Continued)

(51) Int. Cl.
*H04L 1/00* (2006.01)
*H04L 5/00* (2006.01)
(Continued)

(52) U.S. Cl.
CPC .............. *H04L 1/0026* (2013.01); *H04L 5/00* (2013.01); *H04L 5/0051* (2013.01);
(Continued)

(58) Field of Classification Search
CPC ... H04L 1/0026; H04L 5/0048; H04L 5/0094; H04W 72/04; H04W 72/0446; H04W 72/1289
See application file for complete search history.

(56) References Cited

U.S. PATENT DOCUMENTS

2020/0169319 A1\* 5/2020 Kim ................... H04W 72/042

OTHER PUBLICATIONS

Catt, "Group-common PDCCH structure and configuration," R1-1707500, 3GPP TSG RAN WG1 Meeting #89, Hangzhou, P. R. China, May 15-19, 2017, 5 pages.
(Continued)

*Primary Examiner* — Gbemileke J Onamuti
(74) *Attorney, Agent, or Firm* — Fish & Richardson P.C.

(57) ABSTRACT

A method for receiving, by a terminal, a downlink signal in a wireless communication system according to one embodiment of the present invention comprises: a step of receiving setting for a CSI-RS resource; and a step of receiving slot format related information (SFI) over a GC-PDCCH, wherein the terminal receives a CSI-RS on the CSI-RS resource or deactivates the reception of the CSI-RS according to the received SFI over the GC-PDCCH, the SFI indicates whether each of a plurality of resources constituting a slot is a downlink (D) resource, an uplink (U) resource, or a third resource for which D/U is not determined, and the terminal can deactivate the reception of the CSI-RS which has been scheduled on the CSI-RS resource, if the SFI of the GC-PDCCH sets either the U resource or the third resource on the CSI-RS resource.

14 Claims, 8 Drawing Sheets

Related U.S. Application Data filed on Jun. 2, 2017, provisional application No. 62/520,443, filed on Jun. 15, 2017.

(51) Int. Cl.

| | | |
|---|---|---|
| *H04W 72/04* | (2009.01) | |
| *H04W 88/08* | (2009.01) | |
| *H04W 80/08* | (2009.01) | |
| *H04W 72/12* | (2009.01) | |

(52) U.S. Cl.
CPC ........... *H04L 5/0098* (2013.01); *H04W 72/04* (2013.01); *H04W 72/042* (2013.01); *H04W 72/0446* (2013.01); *H04W 72/12* (2013.01); *H04W 80/08* (2013.01)

(56) References Cited

OTHER PUBLICATIONS

Qualcomm Incorporated, "Contents of group common PDCCH," R1-1708614, 3GPP TSG-RAN WG1#89, Hangzhou, P.R. China, May 15-19, 2017, 6 pages.
Intel Corporation, "Group-common PDCCH: Contents," R1-1707385, 3GPP TSG RAN WG1 #89, Hangzhou, P.R. China, May 15-19, 2017, 4 pages.
Office Action in Korean Application No. 10-2018-0063383, dated Jun. 25, 2018, 13 pages. (with English Translation).
Notice of Allowance in Korean Application No. 10-2018-0063383, dated Oct. 22, 2018, 7 pages (with English Translation).
Wilus Inc., "UE Procedure for group common PDCCH for NR," 3GPP TSG RAN WG1 Meeting #89, R1-1708975, Hangzhou, P. R. China, May 15-19, 2017, 6 pages.
LG Electronics, "Discussion on UE behaviour for the group common PDCCH," 3GPP TSG RAN WG1 Meeting #89, R1-1707635, Hangzhou, China May 15-19, 2017, 6 pages.
TR 38.802, "Study on New Radio (NR) Access Technology; Physical Layer Aspects," 3GPP TR 38.802 V1.2.0 (Feb. 2017), 84 pages.
Extended European Search Report in European Application No. 18809673.9, dated Jan. 29, 2020, 12 pages.
Japanese Office Action in Japanese Application No. 2019-510413, dated Jan. 21, 2020, 7 pages (with English translation).
NTT Docomo, Inc., "New Radio (NR) Access Technology," RP-171137, 3GPP TSG RAN meeting #76, West Palm Beach, USA, dated Jun. 5-8, 2017, 218 pages.
NTT Docomo, Inc., "Views on contents of group-common PDCCH," R1-1708468, 3GPP TSG RAN WG1 Meeting #89, Hangzhou, P.R. China, dated May 15-19, 2017, 6 pages, XP051273660.
Wilus Inc., "UE Procedure for group common PDCCH for NR," R1-1708975, 3GPP TSG RAN WG1 Meeting #89, Hangzhou, P. R. China, dated May 15-19, 2017, 5 pages.

\* cited by examiner (a)

(b)

(a)

Followed slot type (b)

METHOD FOR TRANSMITTING OR RECEIVING SIGNAL IN WIRELESS COMMUNICATION SYSTEM AND APPARATUS THEREFOR

CROSS-REFERENCE TO RELATED APPLICATIONS

This application is a National Stage application under 35 U.S.C. § 371 of International Application No. PCT/KR2018/006288, filed on Jun. 1, 2018, which claims the benefit of U.S. Provisional Application No. 62/544,075, filed on Aug. 11, 2017, 62/520,443, filed on Jun. 15, 2017, and 62/514,019, filed on Jun. 2, 2017. The disclosures of the prior applications are incorporated by reference in their entirety.

TECHNICAL FIELD

The present invention relates to a wireless communication system, and more particularly, to a method and apparatus for transmitting or receiving a downlink signal.

BACKGROUND ART

First, the existing 3GPP LTE/LTE-A system will be briefly described. Referring to FIG. 1, the UE performs an initial cell search (S101). In the initial cell search process, the UE receives a Primary Synchronization Channel (P-SCH) and a Secondary Synchronization Channel (S-SCH) from a base station, performs downlink synchronization with the BS, and acquires information such as a cell ID. Thereafter, the UE acquires system information (e.g., MIB) through a PBCH (Physical Broadcast Channel). The UE can receive the DL RS (Downlink Reference Signal) and check the downlink channel status.

After the initial cell search, the UE can acquire more detailed system information (e.g., SIBs) by receiving a Physical Downlink Control Channel (PDCCH) and a Physical Downlink Control Channel (PDSCH) scheduled by the PDCCH (S102).

The UE may perform a random access procedure for uplink synchronization. The UE transmits a preamble (e.g., Msg1) through a physical random access channel (PRACH) (S103), and receives a response message (e.g., Msg2) for the preamble through PDCCH and PDSCH corresponding to the PDCCH. In the case of a contention-based random access, a contention resolution procedure such as additional PRACH transmission (S105) and PDCCH/PDSCH reception (S106) may be performed.

Then, the UE can perform PDCCH/PDSCH reception (S107) and Physical Uplink Shared Channel (PUSCH)/Physical Uplink Control Channel (PUCCH) transmission (S108) as a general uplink/downlink signal transmission procedure. The UE can transmit UCI (Uplink Control Information) to the BS. The UCI may include HARQ ACK/NACK (Hybrid Automatic Repeat reQuest Acknowledgment/Negative ACK), SR (Scheduling Request), CQI (Channel Quality Indicator), PMI (Precoding Matrix Indicator) and/or RI etc.

DISCLOSURE

Technical Problem

An aspect of the present invention is to provide a method of receiving a downlink signal more efficiently and more accurately by a User Equipment (UE).

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present disclosure, a method of receiving a downlink signal by a user equipment (UE) in a wireless communication system includes receiving a configuration for a channel state information-reference signal (CSI-RS) resource, and receiving slot format-related information (SFI) through a group common-physical downlink control channel (GC-PDCCH). The UE may receive a CSI-RS in a CSI-RS resource or deactivate the reception of the CSI-RS in the CSI-RS resource, according to the SFI received through the GC-PDCCH. The SFI may indicate whether each of a plurality of resources included in a slot is a downlink (D) resource, an uplink (U) resource, or a third resource for which D or U is not determined. If the SFI of the GC-PDCCH configures any one of the U resource or the third resource to the CSI-RS resource, the UE may deactivate the reception of the CSI-RS scheduled in the CSI-RS resource.

In another aspect of the present invention, a UE includes a transceiver, and a processor configured to receive a configuration for a CSI-RS resource, and to receive SFI through a GC-PDCCH, by controlling the transceiver. The processor may be configured to receive a CSI-RS in a CSI-RS resource or deactivate the reception of the CSI-RS in the CSI-RS resource, according to the SFI received through the GC-PDCCH. The SFI may indicate whether each of a plurality of resources included in a slot is a D resource, a U resource, or a third resource for which D or U is not determined. If the SFI of the GC-PDCCH configures any one of the U resource or the third resource to the CSI-RS resource, the processor may be configured to deactivate the reception of the CSI-RS scheduled in the CSI-RS resource.

In another aspect of the present invention, a method of transmitting a downlink signal by a base station (BS) in a wireless communication system includes transmitting a configuration for a CSI-RS resource, and transmitting SFI through a GC-PDCCH to a UE group including at least one UE. The BS may indicate to the UE group by the SFI whether each of a plurality of resources included in a slot is a D resource, a U resource, or a third resource for which D or U is not determined. The BS may deactivate reception of a CSI-RS of the UE group which was scheduled in a CSR-RS resource by configuring, through the SFI of the GC-PDCCH, at least one of the U resource or the third resource to the CSI-RS resource.

In another aspect of the present invention, a BS for performing the above method of transmitting a downlink signal may be provided.

If the SFI of the GC-PDCCH configures the CSI-RS resource as the D resource, the UE may receive the CSI-RS in the CSI-RS resource.

The UE may receive downlink control information (DCI) for scheduling an uplink signal or a downlink signal.

The DCI can override the third resource configured by the SFI of the GC-PDCCH.

If a signal scheduled by the DCI locates in the third resource configured by the SFI of the GC-PDCCH, the UE may transmit the uplink signal or receive the downlink signal in the third resource according to the DCI.

The DCI may not be allowed to override the D resource and the U resource configured by the SFI of the GC-PDCCH.

The SFI of the GC-PDCCH may indicate the third resource among third resource candidates indicated to the UE through a semi-static configuration.

For resources which cannot be overrode among resources of a semi-static configuration, the SFI of the GC-PDCCH may not be allowed to configure resources differently from the semi-static configuration.

If the third resource is configured by the SFI in a grant-free transmission resource configured for the UE, a grant-free transmission may not be performed in the third resource.

The third resource may be a flexible resource.

Advantageous Effects

According to an embodiment of the present invention, even though Slot Format-related Information (SFI) is separately indicated for a channel state information-reference signal (CSI-RS) configured for a User Equipment (UE) by a group common-physical downlink control channel (GC-PDCCH), the UE can operate reliably without uplink/downlink (UL/DL) collision or ambiguity in a resource configuration.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

MODE FOR INVENTION

Figure 1:
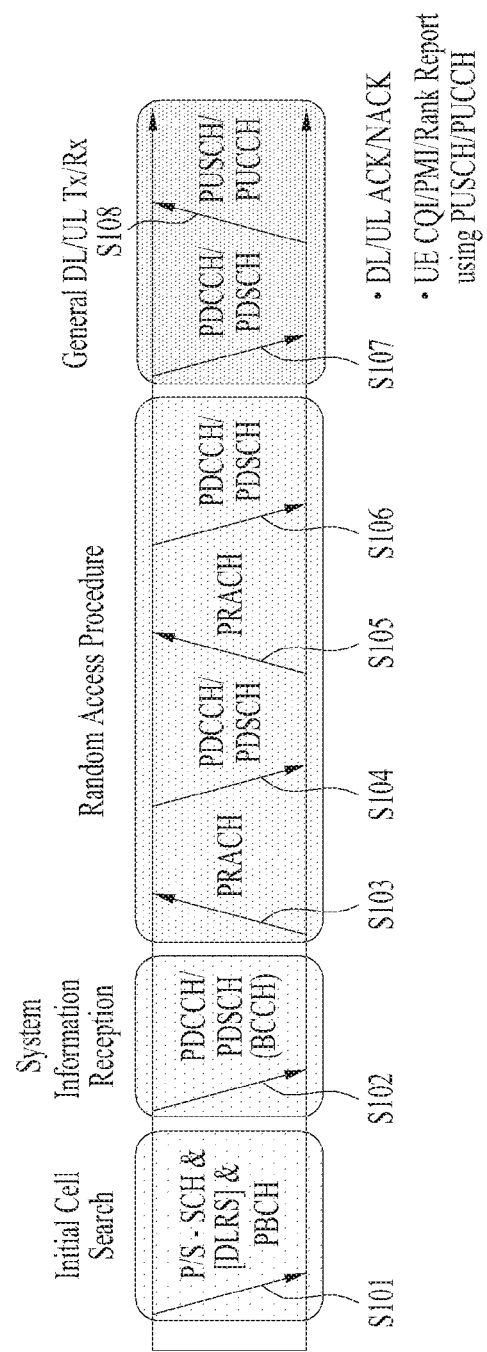
FIG. 1 is an exemplary diagram illustrating physical channels used in a 3rd Generation Partnership Project (3GPP) Long Term Evolution/Long Term Evolution-Advanced (LTE/LTE-A) system, and a general signal transmission method using the physical channels.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP LTE system or 3GPP LTE-A system, by which the technical idea of the present invention may be non-limited. Specific terminologies used in the following description are provided to help understand the present invention and the use of the terminologies can be modified to a different form within a scope of the technical idea of the present invention.

As many as possible communication devices have demanded as high as communication capacity and, thus, there has been a need for enhanced mobile broadband (eMBB) communication compared with legacy radio access technology (RAT) in a recently discussed next-generation communication system. In addition, massive machine type communications (mMTC) for connecting a plurality of devices and objects to provide various services anytime and anywhere is also one of factors to be considered in next-generation communication. In addition, in consideration of a service/user equipment (UE) that is sensitive to reliability and latency, ultra-reliable and low latency communication (URLLC) has been discussed for a next-generation communication system.

As such, new RAT that considers eMBB, mMTC, URLCC, and so on has been discussed for next-generation wireless communication.

Some LTE/LTE-A operations and configuration that are not at variance to a design of New RAT may also be applied to new RAT. For convenience, new RAT may be referred to as 5G mobile communication.

<NR Frame Structure and Physical Resource>

In an NR system, downlink (DL) and downlink (UL) transmission may be performed through frames having duration of 10 ms and each frame may include 10 subframes. Accordingly, 1 subframe may correspond to 1 ms. Each frame may be divided into two half-frames.

1 subframe may include $N_{symb}^{subframe,\mu} = N_{symb}^{slot} \times N_{slot}^{subframe,\mu}$ contiguous OFDM symbols. $N_{symb}^{slot}$ represents the number of symbols per slot, μ represents OFDM numerology, and $N_{slot}^{subframe,\mu}$ represents the number of slots per subframe with respect to corresponding μ. In NR, multiple OFDM numerologies shown in Table 1 below may be supported.

TABLE 1

| μ | Δf = $2^\mu \cdot 15$ [kHz] | Cyclic prefix |
|---|---|---|
| 0 | 15 | Normal |
| 1 | 30 | Normal |

TABLE 1-continued

| μ | Δf = $2^\mu \cdot 15$ [kHz] | Cyclic prefix |
|---|---|---|
| 2 | 60 | Normal, Extended |
| 3 | 120 | Normal |
| 4 | 240 | Normal |

In Table 1 above, Δf refers to subcarrier spacing (SCS). μ and cyclic prefix with respect to a DL carrier bandwidth part (BWP) and μ and cyclic prefix with respect to a UL carrier BWP may be configured for a UE via UL signaling.

Table 2 below shows the number of $N_{symb}^{slot}$ of symbols per slot, the number $N_{slot}^{frame,\mu}$ of symbols per frame, and the number $N_{slot}^{subframe,\mu}$ of slots per subframe with respect to each SCS in the case of normal CP.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Table 3 below shows the number $N_{symb}^{slot}$ of symbols per slot, the number $N_{slot}^{frame,\mu}$ of slots per frame, and the number $N_{slot}^{subframe,\mu}$ of slots per subframe with respect to each SCS in the case of extended CP.

TABLE 3

| μ | $N_{symb}^{slot}$ | $N_{slot}^{frame,\mu}$ | $N_{slot}^{subframe,\mu}$ |
|---|---|---|---|
| 2 | 12 | 40 | 4 |

As such, in an NR system, the number of slots included in 1 subframe may be variable depending on subcarrier spacing (SCS). OFDM symbols included in each slot may correspond to any one of D (DL), U (UL), and X (flexible). DL transmission may be performed in a D or X symbol and UL transmission may be performed in a U or X symbol. A Flexible resource (e.g., X symbol) may also be referred to as a Reserved resource, an Other resource, or a Unknown resource.

In NR, one resource block (RB) may correspond to 12 subcarriers in the frequency domain. A RB may include a plurality of OFDM symbols. A resource element (RE) may correspond to 1 subcarrier and 1 OFDM symbol. Accordingly, 12 REs may be present on 1 OFDM symbol in 1 RB.

A carrier BWP may be defined as a set of contiguous physical resource blocks (PRBs). The carrier BWP may also be simply referred to as a BWP. A maximum of 4 BWPs may be configured for each of UL/DL link in 1 UE. Even if multiple BWPs are configured, 1 BWP may be activated for a given time period. However, when a supplementary uplink (SUL) is configured in a UE, 4 BWPs may be additionally configured for the SUL and 1 BWP may be activated for a given time period. A UE may not be expected to receive a PDSCH, a PDCCH, a channel state information-reference signal (CSI-RS), or a tracking reference signal (TRS) out of the activated DL BWP. In addition, the UE may not be expected to receive a PUSCH or a PUCCH out of the activated UL BWP.

<NR DL Control Channel>

In an NR system, a transmissions NR system, a transmission unit of a control channel may be defined as a resource element group (REG) and/or a control channel element (CCE), etc.

An REG may correspond to 1 OFDM symbol in the time domain and may correspond to 1 PRB in the frequency domain. In addition, 1 CCE may correspond to 6 REGs.

A control resource set (CORESET) and a search space (SS) are briefly described now. The CORESET may be a set of resources for control signal transmission and the search space may be aggregation of control channel candidates for perform blind detection. The search space may be configured for the CORESET. For example, when one search space is defined on one CORESET, a CORESET for a common search space (CSS) and a CORESET for a UE-specific search space (USS) may each be configured. As another example, a plurality of search spaces may be defined in one CORESET. For example, the CSS and the USS may be configured for the same CORESET. In the following example, the CSS may refer to a CORESET with a CSS configured therefor and the USS may refer to a CORESET with a USS configured therefor, or the like.

A base station may signal information on a CORESET to a UE. For example, a CORESET configuration for each CORESET and time duration (e.g., 1/2/3 symbol) of the corresponding CORESET may be signaled. When interleaving for distributing a CCE to 1 symbol-CORESET is applied, 2 or 6 REGs may be bundled. Bundling of 2 or 6 REGs may be performed on 2 symbol-CORESET and time-first mapping may be applied. Bundling of 3 or 6 REGs may be performed on 3 symbol-CORESET and time-first mapping may be applied. When REG bundling is performed, the UE may assume the same precoding with respect to a corresponding bundling unit.

<UE & Network Behavior with Slot Format-Related Information>

When a UE receives slot format-related information (SFI) on a group common-physical downlink control channel (GC-PDCCH) (e.g., downlink control information (DCI) format 2-0) and SFI in UE-specific DCI (e.g., a DL/UL grant received on a PDCCH), a UE operation as to which SFI is to be followed is defined below. For example, the GC-PDCCH and the UE-specific DCI may be prioritized. Therefore, when the UE has the two pieces of information, which information the UE should follow may be determined according to the priorities of the GC-PDCCH and the UE-specific DCI. To distinguish DCI transmitted on a GC-PDCCH (e.g., DCI format 2-0) from UE-specific DCI (e.g., DCI in a format other than DCI format 2-0) corresponding to a UL/DL grant transmitted on a PDCCH (i.e., non-GC-PDCCH), the former is referred to shortly as a GC-PDCCH, whereas the latter is referred to shortly as DCI or dynamic DCI.

A description is also given of a UE operation in the case where the reliability of a GC-PDCCH and UE-specific DCI is not sufficiently ensured.

Further, a relationship between a GC-PDCCH and a semi-static configuration will be described.

First, regarding a method of configuring DL/UL resources in an NR network, (i) SFI may be transmitted to a UE on a GC PDCCH. The SFI transmitted on the GC PDCCH may indicate the type (e.g., downlink/uplink/flexible (D/U/X)) of each symbol included in a corresponding slot. (ii) Scheduling information (e.g., a UL/DL grant) for each UE may be transmitted in UE-specific DCI. For example, DL/UL scheduling of specific resources is based on the premise that the resources are DL/UL resources. Thus, the UE-specific DCI may also be interpreted as configuring DL/UL resources.
(iii) There is a semi-static configuration that semi-statically signals information about resources required for communication of a UE, or information that the UE needs to acquire in terms of a network operation. The semi-static configuration may include signaling for explicitly allocating DL/UL resources. Further, information related to a UL operation, such as an RRC-signaled scheduling request (SR) configuration, sounding reference signal (SR) configuration, or the like may be interpreted as implicitly configuring UL resources, while information related to a DL operation, such as an RRC-signaled CSI-RS configuration, measurement configuration, or the like may be interpreted as implicitly configuring DL resources.

The UE may eventually identify a slot format by using slot information or information about the directions (e.g., U/D/X) of symbols in a slot, which is received (i) on the GC-PDCCH, (ii) in the UE-specific DCI, and (iii) by the semi-static configuration. If collision occurs among (i) the GC-PDCCH, (ii) the UE-specific DCI, and (iii) the semi-static configuration, the UE should determine which information to select, for its operation.

The table of contents/indexes assigned in the following description serve the sole purpose of better aid in understanding the present invention, and the description under each index does not necessarily constitute an independent invention. Unless otherwise contradictory in structure or description, what is described under the indexes may be combined.

I. Slot Format Contents

The GC-PDCCH may indicate a slot format to the UE. The GC-PDCCH may indicate various types of slot formats, and have different payload sizes according to the types.

The size of one slot (i.e., the time-domain length of one slot) may vary with numerologies. The number of symbols in one slot may also vary with numerologies.

The GC-PDCCH may define a slot format on a symbol-by-symbol basis. Further, the GC-PDCCH may indicate a format for a single slot or a format for multiple slots. As the contents of a slot format indicated by the GC-PDCCH, one or more of downlink (D), uplink (U), reserved (R), unknown (K), and empty (E) may be considered. For clarity, D, U, R, K and E are denoted by [D], [U], [R], [K] and [E], respectively. R, K and/or E may collectively be referred to as flexible (X) without any distinction among R, K, and E.

1. Purpose of Each Slot Format Content

[D] may refer to a period in which DL may be expected from the perspective of a UE.

[U] may refer to a period in which a UE may transmit a UL signal.

[E] may refer to a period in which no signal is transmitted. For example, [E] is a period in which the network transmits no signal on purpose. Thus, the UE is not allowed to transmit any signal during the [E] period. For example, interference from a neighbor cell may be measured during the [E] period.

[R] and [K] may serve the following multiple purposes.

(1) [R] (Reserved)

(a) Usages of [R]

(i) Purpose 1: For example, [R] may be used for the purpose of LTE-NR dynamic co-existence. If an LTE PDCCH region or a cell-specific reference signal (CRS) symbol is dynamically changed, [R] may be used to reserve resources for LTE. The network may dynamically allocate [R] for LTE by the GC-PDCCH. In this case, an NR UE may assume that resources configured as [R] by the GC-PDCCH are not used for control information/data/RS mapping. In this case, the UE may assume that a synchronization signal (SS) block, to which an SS (e.g., primary synchronization signal/secondary synchronization signal (PSS/SSS)) and/or a PBCH may be mapped, is not mapped to [R]. Therefore, even when the corresponding resources are configured for transmission of an SS block, the UE may assume that an SS block is not transmitted in the resources. Accordingly, reserved resources serving this purpose may have the property of resource type 1.

Resource type 1: [R] resources of resource type 1 are reserved for all channels/signals within a cell, and dynamic signaling or a semi-static configuration may not override [R] resources of resource type 1.

(ii) Purpose 2: For example, resources available for URLLC scheduling may be configured as [R] by the GC-PDCCH. The amount of allocated [R] resources may also be dynamically changed according to the population of URLLC UEs. A UE may basically perceive [R] as resources for URLLC. URLLC UEs may be divided into different groups, and each group may receive different SFI for an [R] period and accordingly perform URLLC. To this end, the network may transmit different indications for resources corresponding to [R] to an eMBB UE and a URLLC UE. For example, the network may divide UEs into an eMBB UE group and a URLLC UE group, and indicate specific resources as [R] resources to eMBB UEs, while indicating the specific resources as [D] or [U] resources to URLLC UEs. Or the network may set the corresponding resource type to "Unknown" or "Flexible", and change the type of the resources by semi-static signaling or dynamic signaling.

Resource type 2: [R] resources of resource type 2 may be flexible resources, the usage of which may be changed by a semi-static configuration or dynamic signaling. Cell-common data (e.g., an SS block) may also be mapped to the resources. [R] resources of resource type 2 may be interpreted as unknown or flexible, or may be resources similar to unknown or flexible resources.

(iii) Purpose 3: For example, [R] may be indicated by the GC-PDCCH in order to protect an SRS from a grant-free UL transmission. It may be seen that a UL transmission takes place dynamically in a grant-free slot. When it is necessary to transmit an SRS in a grant-free slot, [R] may be defined by the GC-PDCCH to protect SRS resources. For [R], a grant-free transmission signal is subjected to rate matching or puncturing, and thus a semi-static configuration (e.g., grant-free resources) may not override the [R] resources indicated by the GC-PDCCH. If the network has configured SRS resources but does not use the SRS resources, the network may override the SRS resources by dynamic DCI. For example, when the network triggers an aperiodic SRS by DCI, UEs other than grant-free UEs should also be able to use the [R] resources as [U]. Accordingly, changing the configuration of the resources to [U] or [D] by dynamic DCI should be allowed.

Resource type 3: Although a configuration for [R] resources of resource type 3 indicated by the GC-PDCCH may override another semi-static configuration within a cell, the configuration may be overridden by dynamic signaling (e.g., UL/DL grant DCI). Once resources of resource type 3 are configured, a channel and a signal based on a semi-static configuration, such as an SS block, may be rate-matched or punctured for the resources of resource type 3. Meanwhile, it may be configured that resources of resource type 3 do not override an important channel/signal such as an SS block.

(b) Property of [R]

If the semi-static configuration defines [R] for the above purposes, the GC-PDCCH may also define the corresponding resources as [R] in line with the semi-static configuration.

Or candidates which may be defined as [R] by the GC-PDCCH are indicated by the semi-static configuration, and the GC-PDCCH may indicate [R] for a candidate, as a way to confirm use of the candidate as [R] resources.

(2) [K] (Unknown)

(a) Usages of [K]

Purpose 1: [K] may be configured by the GC-PDCCH even for an area in which a DL signal may be received in semi-static resources, such as an SS block, PBCH, or CSI-RS. If the GC-PDCCH indicates [D] for the semi-static resources, a UE may receive a DL signal scheduled in the semi-static resources. On the other hand, if the GC-PDCCH indicates [K] for the semi-static resources, it may be determined that the network has deactivated DL signal reception in the semi-static resources. To re-activate the deactivated semi-static resources, the network may schedule the resources for which [K] is indicated as [D] by DCI.

Purpose 2: When resources indicated as [K] are available as [D] or [U], but which usage between [D] and [U] is not determined, the network may define the resources as [K]. For example, when the network indicates a slot format for multiple slots to a UE, the network may have difficulty in accurately determining the future usage of a slot to be [D] or [U] at the moment, and thus use [K] for the slot.

Purpose 3: [K] may be used to indicate a guard period (GP). Each UE may need a different GP. Nonetheless, there is no way but to configure the same GP for all UEs by the GC-PDCCH. To allow each UE to have a different UE-specific GP, the network may indicate minimum [D] resources and minimum [U] resources by the GC-PDCCH among [D] and [U] resources that the UEs of a group should first have, and allocate [K] to the remaining area. In this case, at least resources for DCI and UCI may be protected. For each UE, a DL/UL direction may be determined for [K] by dynamic scheduling, and the remaining [K] resources may be defined as a UE-specific GP.

On the contrary, the GC-PDCCH may indicate maximum [D] and maximum [U]. Herein, [K] may represent a minimum GP available for a UE group. To allocate a UE-specific GP, the network may schedule [D] and [U] resources less than [D] and [U] resources indicated by the GC-PDCCH for a UE.

Or a UE-specific GP may be configured by a separate control channel (e.g., DCI or the like) or a separate configuration.

(b) Property of [K]

If the semi-static configuration defines [K] for the above purposes, the GC-PDCCH may also define corresponding resources as [K] in line with the semi-static configuration.

Or the semi-static configuration may indicate candidates available as [K] through the GC-PDCCH, and the GC-PDCCH may indicate [K] for a candidate, as a way to confirm that the candidate is used as [K] resources.

DCI may override [K].

2. Override Relationship of Slot Formats

Similarly to I.1.(1) and I.1.(2), an SFI override relationship between a GC-PDCCH and a semi-static configuration or an SFI override relationship between a GC-PDCCH and DCI may be defined according to a slot format or the type of the slot format.

Meanwhile, the GC-PDCCH may collectively indicate [R] and [K] as [K] without any distinction between [R] and [K].

According to an embodiment of the present invention, the network may provide a UE with configuration information by which to override [K].

The network may also indicate one of the following configuration rules that the UE may apply to resources indicated as [K] by the GC-PDCCH, and the UE may operate in conformance to the indicated configuration rule.

For [K]:

semi-static configuration and DCI can override [K];
semi-static configuration and DCI cannot override [K];
semi-static configuration can override [K], while DCI cannot override [K]; and
semi-static configuration cannot override [K], while DCI can override [K].

Meanwhile, information about semi-static resources (e.g., an SS block, a PBCH, a CSI-RS, or the like) may be transmitted to the UE by the semi-static configuration.

It may occur that [D], [U], and [K] which can be indicated by SFI of the GC-PDCCH conflicts with the direction (e.g., DL/UL) of the semi-static resources or should override the semi-static resources. For example, as in the case where the SFI of the GC-PDCCH configures [U] or [K] instead of [D] for semi-static DL RS resources (e.g., CSI-RS resources), or the SFI of the GC-PDCCH configures [D] or [K] instead of [U] for semi-static UL RS resources (e.g., SRS resources), the SFI of the GC-PDCCH may conflict with the semi-static resources. In this case, similarly to the foregoing example, the network may also provide the UE with configuration information indicating the override relationship between semi-static resources and the GC-PDCCH, for each semi-static resource (e.g., SS Block, PBCH, CSI-RS, etc.).

For each semi-static resource,
overriding by the GC-PDCCH is possible; or
overriding by the GC-PDCCH is impossible.

3. Slot Format with Contents

Figure 2:
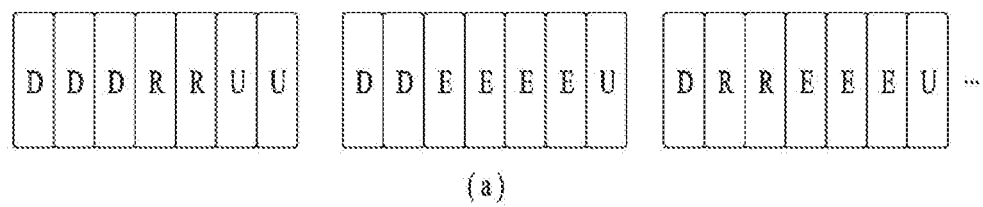
FIG. 2 is a diagram illustrating slot format indications according to an embodiment of the present invention.
Figure 2:
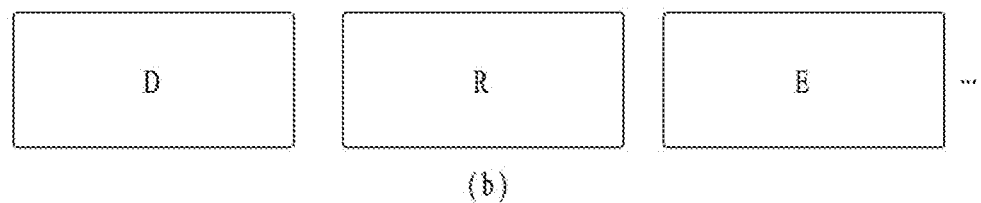

There may be one format per slot (e.g., (b) of FIG. 2), or per symbol in a slot (e.g., (a) of FIG. 2). The number of symbols in a slot depends on a numerology. In the examples illustrated in FIG. 2, an environment in which one slot includes 7 symbols is considered.

II. Prioritize Among the Configurations

If the GC-PDCCH indicates [D] or [U] for resources, and a UE has no information conflicting with the GC-PDCCH, the UE may assume that the resources are used for [D] or [U] as indicated by the GC-PDCCH.

When the GC-PDCCH conflicts with a previous configuration or dynamic DCI, the following UE operation may be considered.

If it is assumed that the GC-PDCCH is commonly applied to eMBB UEs and URLLC UEs, a URLLC UE may also be scheduled or grant-free resources may be configured, in resources configured as [D] by the GC-PDCCH. As such, a UE may assume that the dynamically scheduled resources or grant-free resources, configured in the resources indicated as [D] by the GC-PDCCH are UL resources.

On the contrary, DL data may also be transmitted through URLLC scheduling in resources configured as [U] by the GC-PDCCH. In this case, although the network may configure a part carrying a signal for URLLC as [R], an appropriate slot format may be changed according to demands for URLLA traffic and arrival of URLLC traffic after SFI is transmitted on the GC-PDCCH. Accordingly, at least for URLLC scheduling, DCI is allowed to override GC-PDCCH information.

The above example may be generalized to the following.

In the case where [D]/[U] information (e.g., a GC-PDCCH) about a slot is received on a slot-by-slot basis or [D]/[U] information about multiple slots is received at one time, if scheduling (e.g., DCI) is performed on a mini-slot basis or at intervals of a time unit shorter than a slot, the information received on the GC-PDCCH may be overridden by the DCI.

For resources which may not be overridden by the GC-PDCCH among resources indicated by a semi-static configuration, the GC-PDCCH may be configured in line with the semi-static configuration, or semi-static resources (e.g., grant-free resources) may have a higher priority than the GC-PDCCH.

These operations may be applied equally to [R] as well as [D] and [U].

III. GC-PDCCH Vs. DCI Through Other PDCCH

1. Prioritize According to Control Channel

According to an embodiment of the present invention, the GC-PDCCH and the DCI may be prioritized. In this case, the UE may follow SFI received on a control channel having a higher priority between the GC-PDCCH and the DCI.

The priority levels of the GC-PDCCH and the DCI may be determined according to the transmission periods and usages of the GC-PDCCH and the DCI. For example, on the assumption that the GC-PDCCH is periodically transmitted, and the DCI is aperiodically transmitted when needed, the DCI may be regarded as indicating SFI to dynamically change a slot format, and thus may override the GC-PDCCH. Obviously, the opposite case is also possible, in which when the DCI is periodically transmitted, and the GC-PDCCH is aperiodically transmitted when needed, the GC-PDCCH may override the DCI. The priorities of the GC-PDCCH and the DCI may be determined depending on which between the GC-PDCCH and the DCI delivers SFI more dynamically.

In another example, the priorities of the GC-PDCCH and the DCI may be fixed. For example, the GC-PDCCH or the DCI may always have a higher priority than the DCI or the GC-PDCCH.

(1) Ignore the Lower-Priority Control Channel

It may be defined that once the priorities of the GC-PDCCH and the DCI are determined, a UE does not read the other control channel while the UE follows SFI of a control channel having a higher priority. To this end, one condition needs to be fulfilled, that when the lower-priority control channel is received within n slot(s) indicated by the SFI of the higher-priority control channel, and the end of slots indicated by SFI of the lower-priority control channel is located within the n slots(s), the UE may ignore the lower-layer control channel.

If the lower-priority control channel is received within the n slot(s) indicated by the SFI of the higher-priority control channel, and the end of the slots indicated by the SFI of the lower-layer control channel is beyond the n slot(s), the UE may determine a slot format for application after the n slot(s) by using the SFI of the lower-priority control channel.

Or, in order to prevent the GC-PDCCH from changing slot format information after the UE receives DCI, the UE may be configured not to receive the GC-PDCCH during a time period scheduled for signal transmission and reception by the DCI. This UE operation may be configured along with a decision made as to whether the UE is to monitor a PDCCH other than the GC-PDCCH during the corresponding time period. For example, if the UE does not need to monitor any other PDCCH, the UE may not read the GC-PDCCH either, whereas if the UE monitors any other PDCCH, the UE may also read the GC-PDCCH.

Figure 3:
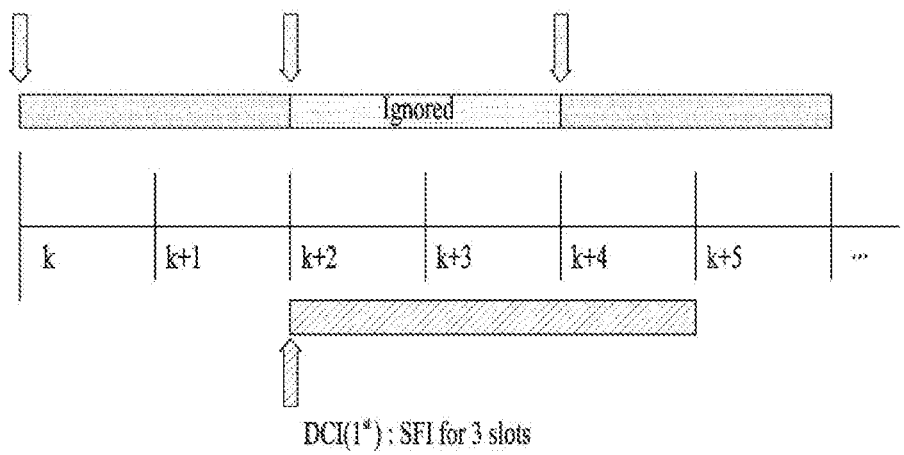
FIG. 3 is a diagram illustrating a relationship between a group common-physical downlink control channel (GC-PDCCH) and downlink control information (DCI) according to an embodiment of the present invention.

FIG. 3 illustrates a relationship between a GC-PDCCH and DCI according to an embodiment of the present invention. FIG. 3 is based on the assumption that the DCI has a higher priority than the GC-PDCCH. The GC-PDCCH is received three times in total, indicating SFI for two slots each time. The DCI indicates SFI for three slots, slot k+2, slot k+3, and slot k+4.

Upon receipt of the DCI indicating SFI for the three slots, slot k+2, slot k+3, and slot k+4, the UE ignores a GC-PDCCH indicating SFI for two slots, slot k+2 and slot k+3, while following the DCI.

2. Prioritize According to Received Time

The priorities of SFI of a GC-PDCCH and SFI of the DCI may be determined according to their received times, with the priorities of the two channels not fixed.

For example, when the UE first receives a GC-PDCCH carrying SFI for n slots, and then receives new SFI in DCI in the middle of the n slots during operation based on the GC-PDCCH, the UE may operate according to the SFI of the DCI, starting from a slot indicated by the new SFI.

On the contrary, when the UE first receives SFI for n slots in DCI, and then receives new SFI on a GC-PDCCH in the middle of the n slots during operation based on the DCI, the UE may operate according to the SFI of the GC-PDCCH, starting from a slot indicated by the new SFI.

Figure 4:
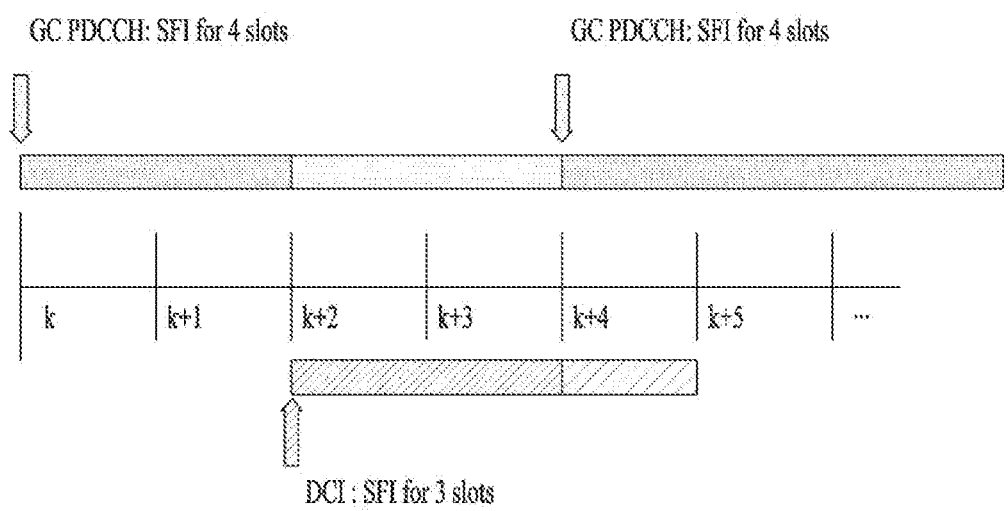
FIG. 4 is a diagram illustrating a relationship between a GC-PDCCH and DCI according to another embodiment of the present invention.

FIG. 4 illustrates a relationship between a GC-PDCCH and DCI according to another embodiment of the present invention.

Referring to FIG. 4, a first GC-PDCCH indicates SFI for four slots, slot k to slot k+3, and a second GC-PDCCH indicates SFI for the next four slots, slot k+4 to slot k+7.

Upon receipt of SFI for three slots, slot k+2, slot k+3, and slot k+4 in DCI during operation according to the first GC-PDCCH, the UE operates according to the SFI of the DCI.

In addition, upon receipt of the second GC-PDCCH during operation according to the DCI, the UE operates according to SFI of the second GC-PDCCH, starting from slot k+4.

3. Prioritize According to Contents

When receiving SFI on the GC-PDCCH and SFI in the DCI, respectively, the UE may determine which information to follow according to the contents of the SFI such as [U]/[D]/[R].

For example, it may be defined that for information related to [D] and [U], the UE follows the SFI of the GC-PDCCH, and for information related to [R], the UE follows the SFI of the DCI.

Or, the opposite case is also possible, in which it may be defined that for information related to [D] and [U], the UE follows the SFI of the DCI, and for information related to [R], The UE follows the SFI of the GC-PDCCH.

[E] is a format that the network declares as not used. Thus, it may be defined that if either of the control channels, GC-PDCCH and DCI first indicates [E], [E] is not overridden by any other information.

As such, the UE may assign priorities depending on which control channel actually carries [D]/[U]/[R] contents.

Figure 5:
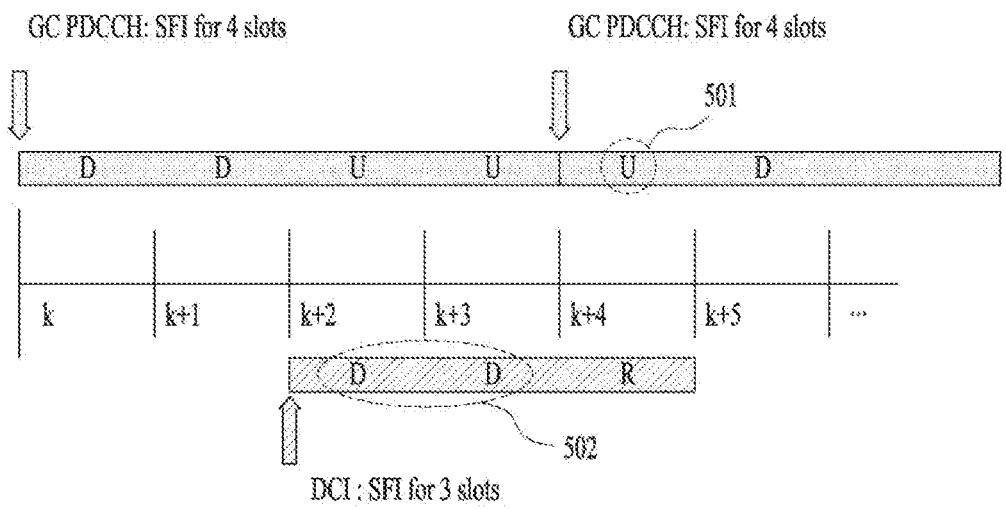
FIG. 5 is a diagram illustrating a relationship between a GC-PDCCH and DCI according to another embodiment of the present invention.
Figure 5:
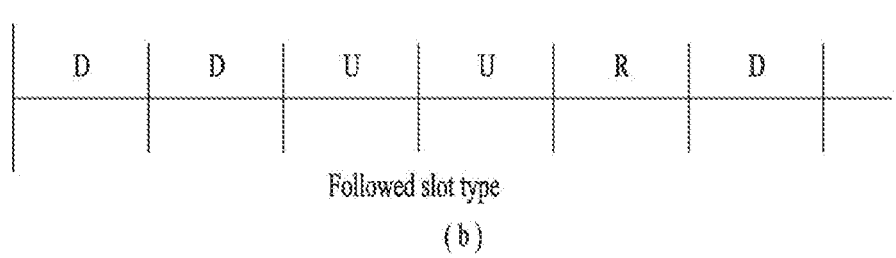

FIG. 5 illustrates a relationship between a GC-PDCCH and DCI according to another embodiment of the present invention. For the convenience of description, it is assumed that for [D]/[U], the GC-PDCCH has a higher priority than the DCI, and for [R], the DCI has a higher priority than the GC-PDCCH.

(a) of FIG. 5 illustrates SFI indicated by the GC-PDCCH and the DCI, and (b) of FIG. 5 indicates SFI followed by a UE.

For slot k+2 and slot k+3, the GC-PDCCH indicates [U], but the DCI indicates [D]. Because the GC-PDCCH has a higher priority for [U]/[D], the UE follows SFI of the GC-PDCCH in slot k+2 and slot k+3, ignoring a [D] part 502 of the DCI.

For slot k+4, the GC-PDCCH indicates [U], but the DCI indicates [R]. Because the DCI has a higher priority for [R], the UE follows SFI of the DCI in slot k+4, ignoring a [U] part 501 of the GC-PDCCH.

Meanwhile, the contents [D]/[U]/[R] may be prioritized irrespective of the types of control channels carrying the contents in another example of the present invention.

(1) Each SFI Contents

Aside from the afore-described case in II., overriding [D]/[U] indicated by the GC-PDCCH by the DCI may generally not be allowed. However, it is assumed that [R] resources indicated by the GC-PDCCH may be overridden by [D] or [U] indicated by dynamic DCI. It may be assumed that [E] indicated by the GC-PDCCH is not changed by dynamic DCI.

(2) Relationship Among [D], [U], [E] or [R]

When [E] and [R] are first defined by the GC-PDCCH or the DCI, the UE may attempt to override [E] and [R] by receiving new SFI indicating [D] and [U] for slot formats corresponding to [E] and [R].

Overriding [R] by [D] or [U] may be allowed. However, only when [R] is not resources reserved for transmission of a specific signal by the network (e.g., Purpose 1 of [R]), but resources reserved for [D] or [U] by the network (e.g., Purpose 2 of [R]), the overriding may be allowed.

Since [E] is a format defined not to be used by either the network or UEs. Therefore, once [E] is defined for an area, overriding [E] by any other format may not be allowed in the area.

On the contrary, [E] or [R] may override [D] or [U]. It may be defined that [E] may always override any other format. If overriding [D] by [R] is attempted for Purpose 2, the UE is likely to fail in receiving control information, and thus overriding [D] by [R] may not be allowed. When overriding [D] by [R] is attempted for Purpose 1, the overriding is intended to use semi-static resources. Thus, overriding [D] by [R] may be allowed.

(3) [D] Overrides [U]/[U] Overrides [D]

When [D] overrides [U], the UE has only to shorten a UL signal, or divide the UL signal and transmit a segment of the UL signal in the next [U]. Therefore, the overriding may be allowed. When overriding [D] by [U] is attempted, the UE is likely to fail in receiving [D], and thus overriding [D] by [U] may not be allowed.

(4) [D] Overrides [D]/[U] Overrides [U]

For already-defined old [D] or [U], SFI indicating new [D] or [U] may be transmitted. In this case, an override relationship may be determined according to the sizes of the old [D] or [U] and the new [D] or [U].

For example, if the new [D] is larger than the old [D], the new [D] may override the old [D]. On the other hand, if the new [D] is smaller than the old [D], overriding the old [D] by the new [D] may not be allowed.

For [U], new [U] may override old [U] irrespective of the size of the new [U].

(5) According to the Indication Range of DCI

An override relationship may be changed according to information received in DCI.

If the DCI indicates the start and duration of a PDSCH/PUSCH, the UE may assume [D] or [U] on the basis of the indicated start and duration, and the [D]/[R] assumption may override [R].

In the case where a PUSCH scheduled by DCI is mapped to resources indicated as [D] by a GC-PDCCH, if the scheduling of the DCI is slot-based, the UE may process the slot-based scheduling of the DCI as an error. If the scheduling of the DCI is mini-slot-based in the same situation, [U] indicated by the DCI may override [D] indicated by the GC-PDCCH. In the case of mini-slot-based scheduling, however, corresponding information may typically not be included. Then, the UE may follow [D]/[U] information of the GC-PDCCH.

If the DCI indicates the time/frequency resources of a PUCCH, an override relationship similar to that in the case in which DCI indicates the start and duration of a PDSCH/PUSCH may be placed. In the case where the DCI schedules a PUCCH in resources indicated as [D] by the GC-PDCCH, if the scheduling of the DCI is slot-based, the UE may process the slot-based scheduling as an error. If the scheduling of the DCI is mini-slot-based, [U] indicated by the DCI may override [D] indicated by the GC-PDCCH.

IV. UE-Behavior According to Control Channel Reception

A UE operation for the case where a UE fails to receive a GC-PDCCH or DCI is defined. In an environment in which each of a GC-PDCCH and DCI may indicate SFI, a UE operation may be defined for the case where the UE fails to receive each control channel. When the UE malfunctions with wrong knowledge of SFI, the UE causes interference to the network and a neighbor UE. Accordingly, there is a need for defining an operation range of a UE having wrong knowledge of SFI.

1. Stop Operation Related with SFI

For example, when the UE fails to receive a GC-PDCCH and thus is not aware of SFI, the UE may discontinue an SFI-related operation until the UE acquires the next SFI. After discontinuing the SFI-related operation, the UE may operate in the following two ways.

First, the UE may monitor DCI or the GC-PDCCH. Since the DCI may also include SFI, upon receipt of the SFI in the DCI, the UE may operate normally.

Secondly, the UE waits until detecting SFI in the GC-PDCCH, ignoring possibly received DCI. In the case where accurate SFI may be derived only by combining SFI received on the two control channels, GC-PDCCH and DCI, the UE without knowledge of the SFI of the GC-PDCCH may ignore the SFI indicated by the DCI even though the SFI is indicated.

2. Fallback Operation

If the UE fails to receive the GC-PDCCH, the UE may basically follow a default slot format or a previously defined slot format. Unless a channel state is too dynamically changed, it may be reasonable for the UE to still use the previously defined slot format. The default slot format may be indicated by higher-layer signaling or a control channel. While the UE follows the default slot format or the previous slot format, the UE may continuously monitor the DCI or the GC-PDCCH, thereby detecting SFI of the DCI or SFI of the GC-PDCCH.

3. Report Receiving Failure

In the case where a UE fails to receive a GC-PDCCH, a default value may be defined to indicate when to transmit a UL report of the reception failure of the GC-PDCCH.

Although the UE may wait for the next GC-PDCCH without reporting the reception failure, the network may then not know whether the reception failure of the GC-PDCCH at the UE is attributed to weak transmission power or a defect of the UE. Therefore, the UE preferably transmits information related to its reception failure (e.g., reference signal received power (RSRP), reference signal received quality (RSRQ), signal to noise ratio (SNR), block error rate (BLER), etc.) to the network. When a specific UE fails to receive a GC-PDCCH, the network may enable all UEs of a UE group including the specific UE to receive the GC-PDCCH by controlling the code rate or the like of the GC-PDCCH. Therefore, reception of a report of the GC-PDCCH reception failure in the network may be meaningful.

A [U] period available for a report of GC-PDCCH reception failure may be defined. For example, the [U] period may always be located at a specific position such as the end or middle of a slot pattern, or the report may be transmitted only in a [U] period indicated by SFI of DCI.

4. According to Reliability of Control Channels

It may be considered that a UE operates by making the most use of SFI of a received GC PDCCH, without discontinuing its operation or operating in an arbitrarily determined slot format.

Whether to follow SFI of a GC-PDCCH or the override priorities of a GC-PDCCH and DCI may be determined according to the reliability of the channels. The reliability may be determined autonomously by the UE, or may be determined and indicated to the UE by the network. The channel reliability may be estimated from, but not limited to, an RSRP, RSRQ, SNR, and/or BLER.

(1) Network Defines Reliability

When the UE determines that the reliability of corresponding GC-PDCCH information is too doubtable to be followed, the UE may report reception information about the GC-PDCCH information. Then, the network may determine the reliability of the GC-PDCCH information, and indicate the determined reliability to the UE.

Three reliability levels may be defined: reliable (level 1)>doubtable (level 2)>unreliable (level 3). When determining the reliability of a GC-PDCCH to be doubtable, the UE may report reception information about the GC-PDCCH information to the network. The information that the UE reports to the network may include, for example, an RSRP, RSRQ, SNR and/or BLER. When the network determines reliability and instructs the UE to operate, a time delay may occur until the UE receives the indication from the network and resumes its operation, but the reliability of the UE operation may be increased.

(2) UE Defines Reliability (Autonomous)

The UE may have a threshold and determine reliability based on the threshold. Many threshold metrics are available, such as RSRP, RSRQ, SNR, BLER, etc.

The UE may have to determine reliability autonomously and operate based on the determination, for example, in the case where although the reliability of control channel information received by the UE is doubtable, a certain time is taken to receive the next control channel and it is difficult for the UE to discontinue its ongoing operation.

For example, the UE may evaluate reliability at three levels: reliable>doubtable>unreliable. The UE may operate in the following manners according to the reliability.

(a) Always Follow IV.1 or IV.2 in the Doubtable & Unreliable Cases

It does not matter much that the UE expects [D] with wrong knowledge of SFI. However, if the UE mistakes [D], [R], or [E] for [U] and thus transmits a UL signal, this may cause a problem. Therefore, when the UE does not have complete trust in a GC-PDCCH, the UE may operate in the same manner as upon failure in receiving the GC-PDCCH.

(b) Follow Doubtable GC-PDCCH

Even though the UE does not have perfect trust in SFI of a GC-PDCCH, the UE may operate based on the SFI of the doubtable GC-PDCCH in order to continue its ongoing operation.

When operating based on the SFI of the doubtable GC-PDCCH, the UE may modify the SFI by using SFI of DCI. In this case, an override relationship between the DCI and the GC-PDCCH may also be defined according to the reliability of the DCI.

If the DCI is reliable, the UE may operate based on the SFI of the DCI during a slot period indicated by the SFI of the DCI.

If the DCI is doubtable, for [D], the UE may follow [D] indicated by the SFI of the DCI, while for [U], the UE may follow [U] indicated by the GC-PDCCH. If the UE transmits [U] wrongly based on UE-specific SFI without sufficient reliability in SFI indicated by UE-specific DCI, another UE or the network may be adversely affected.

If the DCI is unreliable, the UE may follow the SFI of the GC-PDCCH as it is.

V. Network-Behavior According to Control Channel Reception

An environment may be considered, in which the starting and ending times of data as well as SFI are indicated to a UE by a GC-PDCCH or DCI. Network operations may be defined for both cases in which the network is and is not aware of whether information about the starting/ending time of data has been received successfully at a UE.

An environment may be considered, in which one transport block (TB) may include a plurality of code block groups (CBGs), and a UE transmits an acknowledgement/negative acknowledgement (ACK/NACK) for each CBG.

The following environment may be problematic. The UE may receive new SFI indicating a [D] period shorter or longer than a [D] period of a slot format which has initially been indicated based on an override relationship between control channels. If the network has perfect knowledge of the transmission state of SFI at the UE, there may be no problem. However, the network may not be sure whether the UE has succeeded in receiving the updated slot format. If the network has knowledge of the state of the UE, no problem occurs. Even though the network does not have knowledge of the state of the UE, the network needs to operate in a manner that enables the UE to efficiently receive a DL signal.

1. Puncturing and Retransmission

When new SFI indicating a [D] period longer than a [D] period of a previously indicated slot format is transmitted to the UE, and the network is not capable of determining whether the UE has succeeded in receiving the new SFI, the network may transmit a DL signal in correspondence with the [D] period of the previously indicated slot format. In this case, even though the UE has failed in receiving the new SFI, the UE may have no problem with receiving the DL signal. If the UE has succeeded in receiving the new SFI, an unused extra [D] period exists without any problem in reception of the DL signal at the UE.

On the other hand, when new SFI indicating a [D] period shorter than a [D] period of a previously indicated slot format is transmitted to the UE, and the network is not capable of determining whether the UE has succeeded in receiving the new SFI, a problem may occur. If a DL signal to be transmitted by the network lasts as long as the [D] period of the previously indicated slot format, there is a need for a method of transmitting a DL signal successfully irrespective of SFI perceived by the UE.

For example, if the network has DL data corresponding to the [D] period of the previously indicated slot format, the network may puncture as much DL data as the difference between the [D] period of the previously indicated slot format and the [D] period of the newly indicated slot format, and transmit the resulting data.

If the UE has failed in receiving the new SFI, the UE may attempt to receive even the punctured part, whereas if the UE has succeeded in receiving the new SFI, the UE may not attempt to receive the punctured part. If the UE knows a transport block size (TB S), the UE may transmit a NACK for the punctured part, irrespective of whether the UE attempts to receive the punctured part. Upon receipt of the NACK, the network may transmit the punctured part with a redundancy version (RV) used at an initial transmission (e.g., RV0) to the UE. Or if the UE transmits a NACK for the non-punctured part, the network may retransmit the previously transmitted corresponding data with RV1.

Figure 6:
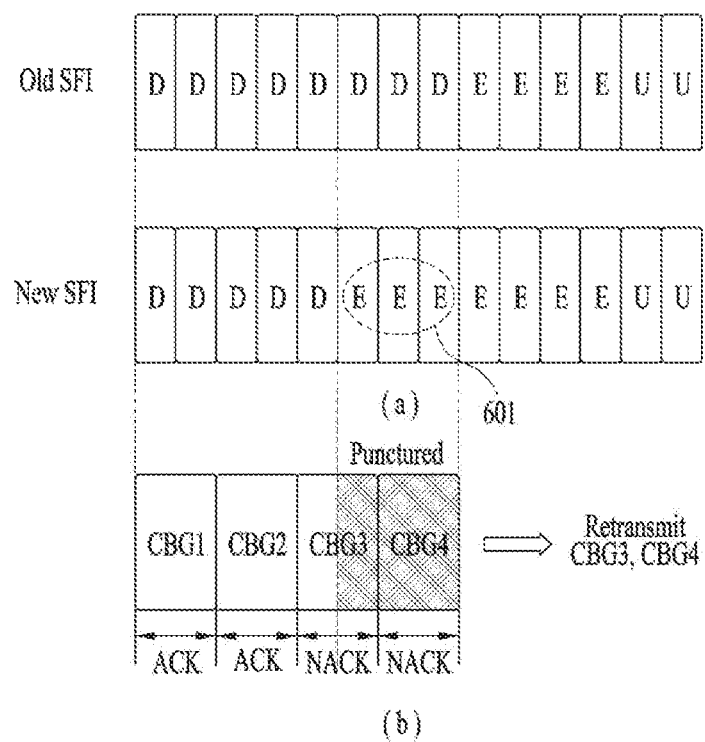
FIG. 6 is a diagram illustrating DL signal transmission according to an embodiment of the present invention.

FIG. 6 is a view illustrating DL signal transmission according to an embodiment of the present invention. Specifically, (a) of FI. 6 illustrates old SFI and new SFI, and (b) of FIG. 6 illustrates puncturing and retransmission of DL data transmitted by the network. In (b) of FIG. 6, a shaded part denotes punctured data.

Referring to (a) of FIG. 6, the new SFI includes an [E] period 601, and thus has a [D] period shorter than the old SFI. That is, the old [D] period is shortened in view of the new SFI.

It is assumed that one TB to be transmitted by the network includes four CBGs, and eight [D] resources are required to transmit one TB.

Since the new SFI includes only five [D] resources, the network may transmit the TB by puncturing DL data corresponding to three [E] resources 601 in the TB. As a result, CBG 1 and CBG 2 are fully transmitted, with CBG 3 partially transmitted and CBG 4 not transmitted.

The UE may be aware that smaller data than one TBS has been received, and transmits ACK, ACK, NACK, and NACK as hybrid automatic repeat request-acknowledgement (HARQ-ACK) information for the respective CBGs, CBG 1, CBG 2, CBG 3, and CBG 4.

Upon receipt of the HARQ-ACK information, the network transmits CBG 3 and CBG 4 to the UE.

2. Packing and Retransmission

When the network has transmitted new SFI indicating a longer [D] period than a [D] period of an old slot format, and is not aware whether the UE has succeeded in receiving the new SFI, the network may transmit a DL signal in correspondence with the [D] period of the old slot format. In this case, even though the UE has failed in receiving the new SFI, the UE has no problem in receiving the DL signal, whereas if the UE has succeeded in receiving the new SFI, the UE has no problem in receiving the DL signal, only with the resulting extra [D] period.

According to an embodiment of the present invention, the reception performance of a DL signal at the UE may be improved by using the extra [D] resources brought by the new SFI. For example, the network may retransmit (repeatedly transmit) the data scheduled in the old [D] period in the extra [D] resources.

Figure 7:
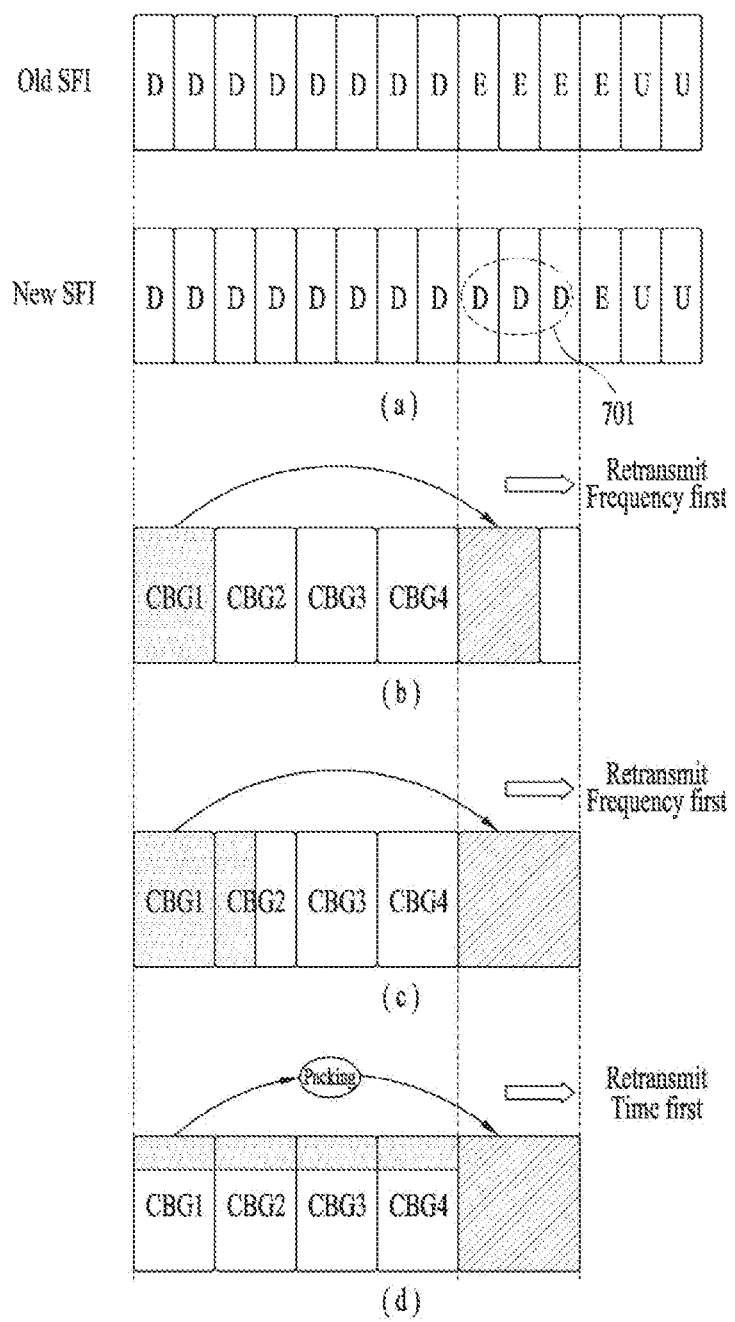
FIG. 7 is a diagram illustrating downlink (DL) signal transmission according to another embodiment of the present invention.

The retransmission data may be extracted in a frequency-first manner (e.g., (b) and (c) of FIG. 7), or in a time-first manner (e.g., (d) of FIG. 7).

In the case of frequency-first extraction, the network may perform a retransmission on a CBG basis (e.g., (b) of FIG. 7), or divide a corresponding CBG at a specific time in the middle to fully map data to the extra [D] resources and retransmit data (e.g., (c) of FIG. 7).

In the case of time-first extraction, data may be extracted by dividing CBGs in the middle along the frequency axis ((d) of FIG. 7).

With the frequency-first extraction, a retransmission does not require an additional process, while with the time-first extraction, extracted CBG parts may additionally be packed so as to be filled in the extra [D] resources.

When data is extracted and retransmitted in the frequency-first or time-first manner, the network may change the RV of the retransmission data in the order of RV0, RV1, . . . . For example, retransmissions may be performed in an RV pattern of RV0, RV2, RV3, and RV1.

If the network is to perform a retransmission, the network may indicate to the UE whether the retransmission is to be performed by DCI and/or higher-layer signaling, along with transmission of new SFI. When the network indicates whether the retransmission is to be performed, along with transmission of the new SFI, if the UE fails in receiving the new SFI, the UE receives data according to the old SFI. Therefore, although the UE is not capable of receiving the retransmission data, the UE has no problem in receiving at least initial transmission data. If the UE succeeds in receiving the new SFI, the UE is capable of determining that the retransmission will take place, and thus receiving both of the initial transmission data and the retransmission data.

FIG. 7 is a view illustrating a DL signal transmission method according to an embodiment of the present invention. (a) of FIG. 7 illustrates old SFI and new SFI, (b) and (c) of FIG. 7 illustrate frequency-first extraction, and (d) of FIG. 7 illustrates time-first extraction.

Referring to (a) of FIG. 7, the new SFI includes a [D] period 701, and thus has a longer [D] period than that of the old SFI. That is, the [D] period 701 corresponds to extra [D] resources.

It is assumed that one TB to be transmitted by the network includes four CBGs, and eight [D] resources are required to transmit one TB.

It is assumed that for the convenience of description, data to be retransmitted (repeatedly transmitted) in the extra [D] resources starts from CBG1 in (b) and (c) of FIG. 7, and starts from a high frequency in (d) of FIG. 7. However, the present invention is not limited thereto, and many other data choices are available for retransmission.

Referring to (b) of FIG. 7, a retransmission is performed on a CBG basis. Thus, the network selects CBG 1 and maps CBG 1 to two of three extra [D] resources.

Referring to (c) of FIG. 7, the network selects the whole of CBG 1 and part of CBG 2 and maps the selected CBGs to the three extra [D] resources.

Referring to (d) of FIG. 7, the network selects a partial frequency band of CBG 1 to CBG 4, packs the selected data in correspondence with the extra [D] resources, and maps the packed data.

Figure 8:
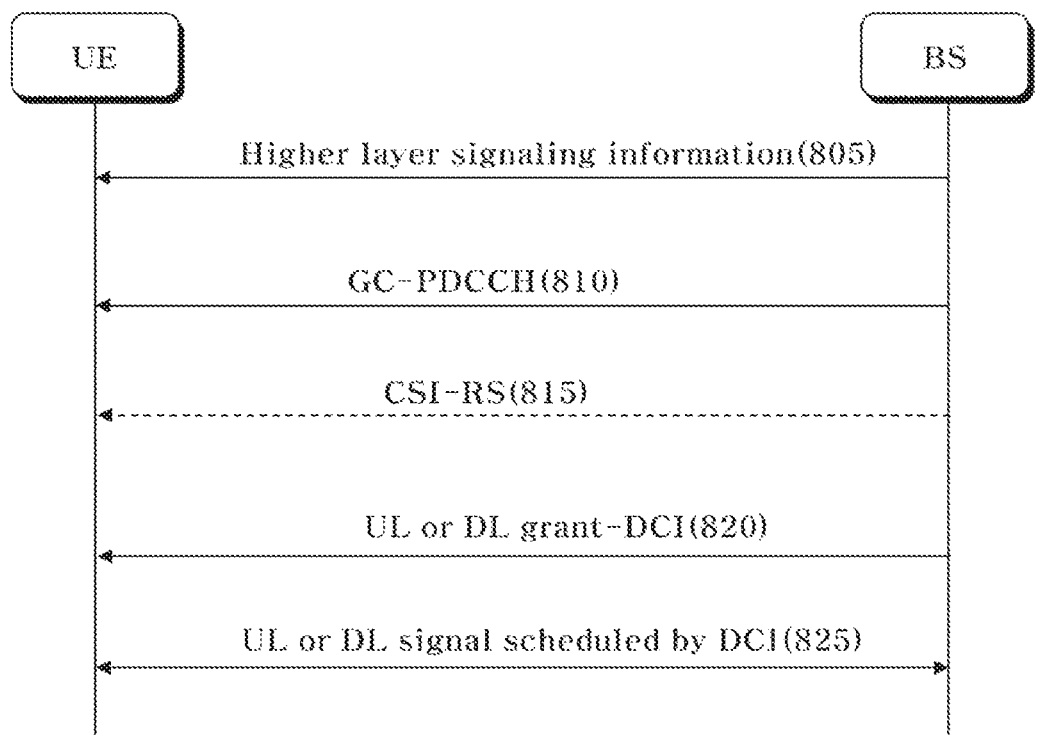
FIG. 8 is a diagram illustrating a signal flow for a method of transmitting and receiving a DL signal according to an embodiment of the present invention.

FIG. 8 is a diagram illustrating a signal flow for a method of transmitting and receiving a DL signal according to an embodiment of the present invention. FIG. 8 is a mere exemplary implementation of the foregoing embodiments, not limiting the scope of the present invention, and reference may be made to the foregoing description, for FIG. 8.

A UE receives higher-layer signaling information from a base station (BS) (805). While the higher-layer signaling information is shown in FIG. 8 as received once for the convenience of description, it is also possible to transmit the higher-layer signaling information separately in a plurality of times. The higher-layer signaling information may include, for example, a semi-static U/D resource configuration. The higher-layer signaling information may include at least one of a UE-dedicated RRC-signaled CSI-RS resource configuration, SRS resource configuration, CSI measurement configuration, and grant-free resource configuration. For the convenience, it is assumed that a CSI-RS resource configuration has been configured for the UE by higher-layer signaling. The CSI-RS resource configuration may specify resources for a periodic CSI-RS.

The UE receives SFI through a GC-PDCCH (810). From the perspective of the BS, it may be understood that the SFI is transmitted to a UE group including the UE illustrated in FIG. 8 through the GC-PDCCH. The SFI may indicate whether each of a plurality of resources (e.g., symbols) included in a slot is a D resource, a U resources, or a third resource for which D/U is not determined yet.

The UE may receive a CSI-RS in a CSI-RS resource (815) or deactivate CSI-RS reception in the CSI-RS resource, according to the SFI received through the GC-PDCCH. If the SFI of the GC-PDCCH configures any one of the U resource and the third resource to the CSI-RS resource, the UE may deactivate the reception of the CSI-RS scheduled in the CSI-RS resource. Deactivation of the CSI-RS reception may refer to cancellation of the CSI-RS reception, that is, non-reception of the CSI-RS in the CSI-RS resource at the UE. Accordingly, only if the SFI of the GC-PDCCH configures the whole CSI-RS resource as a D resource, the UE may receive the CSI-RS in the CSI-RS resource. From the perspective of the BS, the BS may configure at least one of the U resource and the third resource through the SFI of the GC-PDCCH in the CSI-RS resource, in order to deactivate CSI-RS reception of the UE group which was scheduled in the CSI-RS resource.

The UE may receive DCI that schedules a UL or DL signal (820).

The DCI may override the third resource configured by the SFI of the GC-PDCCH.

If the signal scheduled by the DCI locates in the third resource indicated by the SFI of the GC-PDCCH, the UE may transmit a UL signal or receive a DL signal in the third resource according to the DCI.

The DCI may not be allowed to override D resource and U resource configured by the SFI of the GC-PDCCH.

The SFI of the GC-PDCCH may indicate the third resource among third resource candidates indicated to the UE through a semi-static configuration.

For resources for which overriding is not allowed among resources of the semi-static configuration, the GC-PDCCH may not be allowed to configure resources differently from the semi-static configuration.

When the SFI configures the third resource to a grant-free transmission resource configured for the UE, a grant-free transmission may not be performed in the third resource.

The third resource may be a flexible resource. For example, the third resource may include a GP between a D resource and a U resource.

Figure 9:
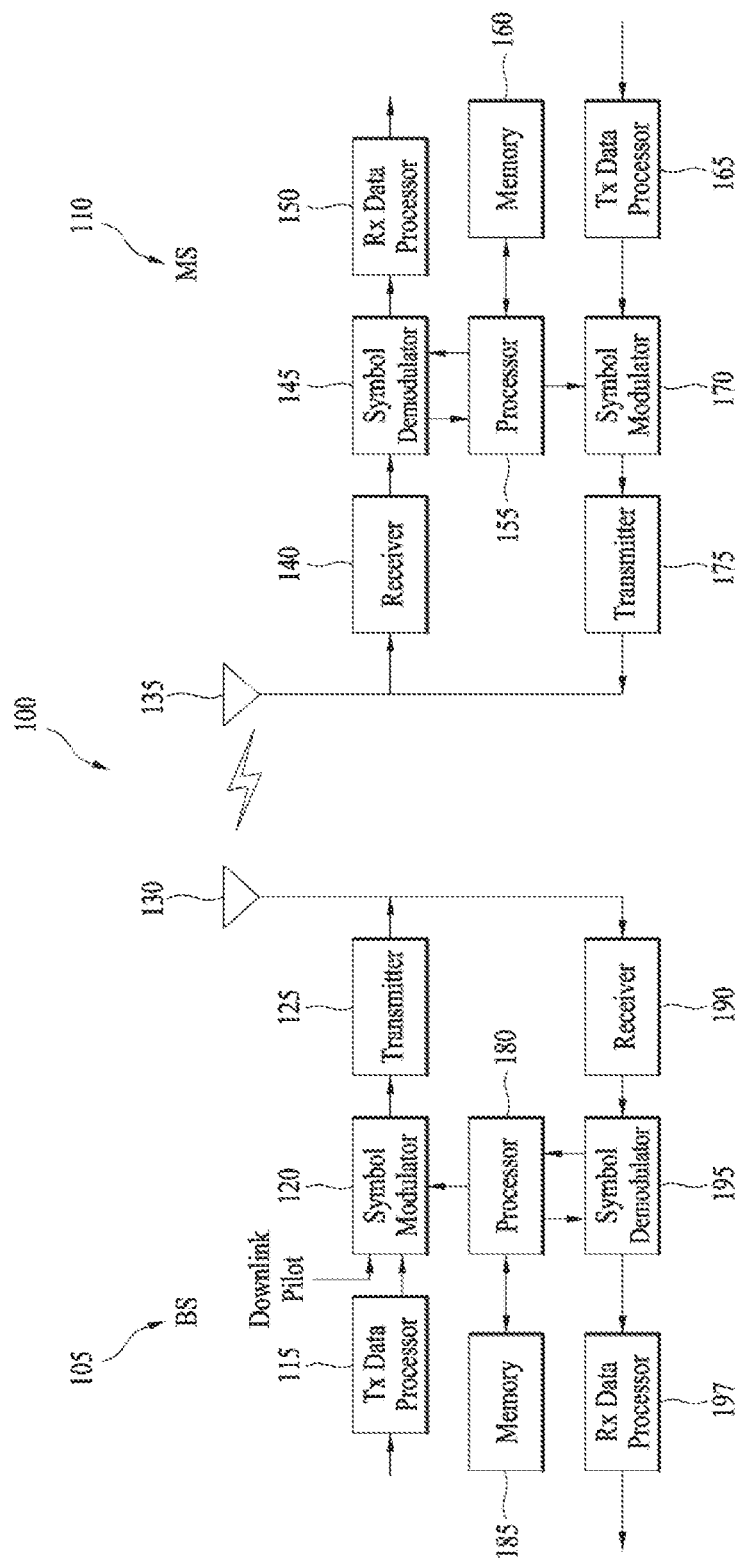
FIG. 9 is a block diagram of a user equipment (UE) and a base station (BS) according to an embodiment of the present invention.

FIG. 9 is a block diagram illustrating a structure of a base station (BS) 105 and a UE 110 in a wireless communication system 100 according to an embodiment of the present invention. The BS 105 may be referred to as an eNB or a gNB. The UE 110 may be referred to a user terminal.

Although one BS 105 and one UE 110 are illustrated for simplifying the wireless communication system 100, the wireless communication system 100 may include one or more BSs and/or one or more UEs.

The BS 105 may include a transmission (Tx) data processor 115, a symbol modulator 120, a transmitter 125, a transmission/reception antenna 130, a processor 180, a memory 185, a receiver 190, a symbol demodulator 195, and a reception (Rx) data processor 197. The UE 110 may include a Tx data processor 165, a symbol modulator 170, a transmitter 175, a transmission/reception antenna 135, a processor 155, a memory 160, a receiver 140, a symbol demodulator 155, and an Rx data processor 150. In FIG. 12, although one antenna 130 is used for the BS 105 and one antenna 135 is used for the UE 110, each of the BS 105 and the UE 110 may also include a plurality of antennas as necessary. Therefore, the BS 105 and the UE 110 according to the present invention support a Multiple Input Multiple Output (MIMO) system. The BS 105 according to the present invention can support both a Single User-MIMO (SU-MIMO) scheme and a Multi User-MIMO (MU-MIMO) scheme.

In downlink, the Tx data processor 115 receives traffic data, formats the received traffic data, codes the formatted traffic data, interleaves the coded traffic data, and modulates the interleaved data (or performs symbol mapping upon the interleaved data), such that it provides modulation symbols (i.e., data symbols). The symbol modulator 120 receives and processes the data symbols and pilot symbols, such that it provides a stream of symbols.

The symbol modulator 120 multiplexes data and pilot symbols, and transmits the multiplexed data and pilot symbols to the transmitter 125. In this case, each transmission (Tx) symbol may be a data symbol, a pilot symbol, or a value of a zero signal (null signal). In each symbol period, pilot symbols may be successively transmitted during each symbol period. The pilot symbols may be an FDM symbol, an OFDM symbol, a Time Division Multiplexing (TDM) symbol, or a Code Division Multiplexing (CDM) symbol.

The transmitter 125 receives a stream of symbols, converts the received symbols into one or more analog signals, and additionally adjusts the one or more analog signals (e.g., amplification, filtering, and frequency upconversion of the analog signals), such that it generates a downlink signal appropriate for data transmission through an RF channel. Subsequently, the downlink signal is transmitted to the UE through the antenna 130.

Configuration of the UE 110 will hereinafter be described in detail. The antenna 135 of the UE 110 receives a DL signal from the BS 105, and transmits the DL signal to the receiver 140. The receiver 140 performs adjustment (e.g., filtering, amplification, and frequency downconversion) of the received DL signal, and digitizes the adjusted signal to obtain samples. The symbol demodulator 145 demodulates the received pilot symbols, and provides the demodulated result to the processor 155 to perform channel estimation.

The symbol demodulator 145 receives a frequency response estimation value for downlink from the processor 155, demodulates the received data symbols, obtains data symbol estimation values (indicating estimation values of the transmitted data symbols), and provides the data symbol estimation values to the Rx data processor 150. The Rx data processor 150 performs demodulation (i.e., symbol-demapping) of data symbol estimation values, deinterleaves the demodulated result, decodes the deinterleaved result, and recovers the transmitted traffic data.

The processing of the symbol demodulator 145 and the Rx data processor 150 is complementary to that of the symbol modulator 120 and the Tx data processor 115 in the BS 205.

The Tx data processor 165 of the UE 110 processes traffic data in uplink, and provides data symbols. The symbol modulator 170 receives and multiplexes data symbols, and modulates the multiplexed data symbols, such that it can provide a stream of symbols to the transmitter 175. The transmitter 175 obtains and processes the stream of symbols to generate an uplink (UL) signal, and the UL signal is transmitted to the BS 105 through the antenna 135. The transmitter and the receiver of UE/BS can be implemented as a single radio frequency (RF) unit.

The BS 105 receives the UL signal from the UE 110 through the antenna 130. The receiver processes the received UL signal to obtain samples. Subsequently, the symbol demodulator 195 processes the symbols, and provides pilot symbols and data symbol estimation values received via uplink. The Rx data processor 197 processes the data symbol estimation value, and recovers traffic data received from the UE 110.

A processor 155 or 180 of the UE 110 or the BS 105 commands or indicates operations of the UE 110 or the BS 105. For example, the processor 155 or 180 of the UE 110 or the BS 105 controls, adjusts, and manages operations of the UE 210 or the BS 105. Each processor 155 or 180 may be connected to a memory unit 160 or 185 for storing program code and data. The memory 160 or 185 is connected to the processor 155 or 180, such that it can store the operating system, applications, and general files.

The processor 155 or 180 may also be referred to as a controller, a microcontroller), a microprocessor, a microcomputer, etc. In the meantime, the processor 155 or 180 may be implemented by various means, for example, hardware, firmware, software, or a combination thereof. In a hardware configuration, methods according to the embodiments of the present invention may be implemented by the processor 155 or 180, for example, one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present invention may be implemented in the form of modules, procedures, functions, etc. which perform the above-described functions or operations. Firmware or software implemented in the present invention may be contained in the processor 155 or 180 or the memory unit 160 or 185, such that it can be driven by the processor 155 or 180.

Radio interface protocol layers among the UE 110, the BS 105, and a wireless communication system (i.e., network) can be classified into a first layer (L1 layer), a second layer (L2 layer) and a third layer (L3 layer) on the basis of the lower three layers of the Open System Interconnection (OSI) reference model widely known in communication systems. A physical layer belonging to the first layer (L1) provides an information transfer service through a physical channel. A Radio Resource Control (RRC) layer belonging to the third layer (L3) controls radio resources between the UE and the network. The UE 110 and the BS 105 may exchange RRC messages with each other through the wireless communication network and the RRC layer.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

As described above, the present invention may be applied to various wireless communication systems.

The invention claimed is:

1. A method of receiving a downlink signal by a user equipment (UE) in a wireless communication system, the method comprising:
   receiving a configuration for a channel state information-reference signal (CSI-RS) resource; and
   receiving slot format-related information (SFI) through a group common-physical downlink control channel (GC-PDCCH),
   wherein the UE receives a CSI-RS in a CSI-RS resource or deactivates the reception of the CSI-RS in the CSI-RS resource, according to the SFI received through the GC-PDCCH,
   wherein the SFI of the GC-PDCCH indicates whether each of a plurality of resources included in a slot is a downlink (D) resource, an uplink (U) resource, or a third resource for which D or U is not determined, and the third resource is indicated by the SFI of the GC-PDCCH from among third resource candidates which are indicated to the UE through a semi-static configuration, and
   wherein if the SFI of the GC-PDCCH configures any one of the U resource or the third resource to the CSI-RS resource, the UE deactivates the reception of the CSI-RS scheduled in the CSI-RS resource.

2. The method according to claim 1, wherein if the SFI of the GC-PDCCH configures the CSI-RS resource as the D resource, the UE receives the CSI-RS in the CSI-RS resource.

3. The method according to claim 1, further comprising:
   receiving downlink control information (DCI) for scheduling an uplink signal or a downlink signal after receiving the SFI,
   wherein the DCI can override the third resource configured by the SFI of the GC-PDCCH.

4. The method according to claim 3, wherein if a signal scheduled by the DCI locates in the third resource configured by the SFI of the GC-PDCCH, the UE transmits the uplink signal or receives the downlink signal in the third resource according to the DCI.

5. The method according to claim 3, wherein the DCI is not allowed to override the D resource and the U resource configured by the SFI of the GC-PDCCH.

6. The method according to claim 1, wherein for resources which cannot be overrode among resources of a semi-static configuration, the SFI of the GC-PDCCH is not allowed to configure resources differently from the semi-static configuration.

7. The method according to claim 1, wherein if the third resource is configured by the SFI in a grant-free transmission resource configured for the UE, a grant-free transmission is not performed in the third resource.

8. The method according to claim 1, wherein the third resource is a flexible resource.

9. A method of transmitting a downlink signal by a base station (BS) in a wireless communication system, the method comprising:
  transmitting a configuration for a channel state information-reference signal (CSI-RS) resource; and
  transmitting slot format-related information (SFI) through a group common-physical downlink control channel (GC-PDCCH) to a user equipment (UE) group including at least one UE,
  wherein the BS indicates to the UE group by the SFI whether each of a plurality of resources included in a slot is a downlink (D) resource, an uplink (U) resource, or a third resource for which D or U is not determined, and the third resource is indicated by the SFI of the GC-PDCCH from among third resource candidates which are indicated to the UE through a semi-static configuration, and
  wherein the BS deactivates reception of a CSI-RS of the UE group which was scheduled in a CSR-RS resource by configuring, through the SFI of the GC-PDCCH, at least one of the U resource or the third resource to the CSI-RS resource.

10. The method according to claim 9, further comprising:
  transmitting downlink control information (DCI) for scheduling an uplink signal or a downlink signal after transmitting the SFI,
  wherein the DCI can override the third resource configured by the SFI of the GC-PDCCH.

11. The method according to claim 10, wherein if a signal scheduled by the DCI locates in the third resource configured by the SFI of the GC-PDCCH, the BS receives the uplink signal or transmits the downlink signal in the third resource according to the DCI.

12. The method according to claim 10, wherein the DCI is not allowed to override the D resource and the U resource configured by the SFI of the GC-PDCCH.

13. The method according to claim 9, wherein the BS indicates the third resource by the SFI of the GC-PDCCH among third resource candidates indicated to the UE through a semi-static configuration.

14. A user equipment (UE) comprising:
  a transceiver; and
  a processor configured to receive a configuration for a channel state information-reference signal (CSI-RS) resource, and to receive slot format-related information (SFI) through a group common-physical downlink control channel (GC-PDCCH), by controlling the transceiver,
  wherein the processor is configured to receive a CSI-RS in a CSI-RS resource or deactivate the reception of the CSI-RS in the CSI-RS resource, according to the SFI received through the GC-PDCCH,
  wherein the SFI indicates whether each of a plurality of resources included in a slot is a downlink (D) resource, an uplink (U) resource, or a third resource for which D or U is not determined, and the third resource is indicated by the SFI of the GC-PDCCH from among third resource candidates which are indicated to the UE through a semi-static configuration, and
  wherein if the SFI of the GC-PDCCH configures any one of the U resource or the third resource to the CSI-RS resource, the processor is configured to deactivate the reception of the CSI-RS scheduled in the CSI-RS resource.

* * * * *